(12) United States Patent
Kuehner et al.

(10) Patent No.: US 7,256,563 B2
(45) Date of Patent: Aug. 14, 2007

(54) METHOD AND DEVICE FOR THE SENSOR REDUCED REGULATION OF A PERMANENT MAGNET EXCITED SYNCHRONOUS MACHINE

(75) Inventors: Jochen Kuehner, Backnang-Heiningen (DE); Klaus Rechberger, Ludwigsburg (DE)

(73) Assignee: Robert Bosch, Stuttgart (DE)

( * ) Notice: Subject to any disclaimer, the term of this patent is extended or adjusted under 35 U.S.C. 154(b) by 0 days.

(21) Appl. No.: 10/510,287

(22) PCT Filed: Feb. 10, 2003

(86) PCT No.: PCT/DE03/00375

§ 371 (c)(1),
(2), (4) Date: Oct. 6, 2004

(87) PCT Pub. No.: WO03/094338

PCT Pub. Date: Nov. 13, 2003

(65) Prior Publication Data

US 2005/0231150 A1     Oct. 20, 2005

(30) Foreign Application Priority Data

May 3, 2002     (DE) .............................. 102 19 822

(51) Int. Cl.
*H02P 7/00* (2006.01)
(52) U.S. Cl. ...................... 318/432; 318/719
(58) Field of Classification Search ............ None
See application file for complete search history.

(56) References Cited

U.S. PATENT DOCUMENTS

2004/0070363 A1* 4/2004 Bardsley et al. ............ 318/727

2004/0257011 A1* 12/2004 Rechberger ................. 318/139

FOREIGN PATENT DOCUMENTS

EP     1 187 307      3/2002
WO     WO 01/20751    3/2001

OTHER PUBLICATIONS

Morimoto S et al: "Wide-Speed Operation of Interior Permanent Magnet Synchronous Motors with High-Performance Current Regulator" IEEE Transactions on Industry Applications, IEEE Inc. New York, US, BD. 30, NR. 4, Jul. 1, 1994, Seiten 920-926, XP000469578 ISSN: 0093-9994 Das Ganze Dokument.
The Journal ETEP, vol. 8, No. 3, May/Jun. 1998, pp. 157-166.

* cited by examiner

*Primary Examiner*—Lincoln Donovan
*Assistant Examiner*—Erick Glass
(74) *Attorney, Agent, or Firm*—Kenyon & Kenyon LLP

(57) ABSTRACT

A method and a device for providing field-oriented regulation of a synchronous machine excited by a permanent magnet, in which a direct-axis voltage component and a quadrature-axis voltage component of the control voltage for the synchronous machine are determined from a quadrature-axis current component setpoint value thus determined and from rotational speed information using a stationary machine model in a decoupling network. These voltage components are converted into triggering pulses for the synchronous machine. The regulating system does not require any information regarding the phase currents of the polyphase system.

16 Claims, 3 Drawing Sheets

METHOD AND DEVICE FOR THE SENSOR REDUCED REGULATION OF A PERMANENT MAGNET EXCITED SYNCHRONOUS MACHINE

FIELD OF THE INVENTION

The present invention relates to a method and device for providing sensor-reduced regulation of a synchronous machine excited by a permanent magnet.

BACKGROUND INFORMATION

It is already understood in automotive engineering that a synchronous machine excited by a permanent magnet (PM synchronous machine) may be installed in the drive train of a vehicle as an integrated crankshaft starter generator between the internal combustion engine and the transmission.

Such a PM synchronous machine is regulated in the rotor-field-oriented coordinate system. FIG. 1 shows an example of field-oriented current regulation of a PM synchronous machine having a pulse-width-modulation inverter. This is based on an actual value measurement of the phase currents of a three-phase system and determination of a direct-axis component and a quadrature-axis component of the regulating voltage with respect to the rotor position, based on actual measured values. The quadrature-axis component of current is proportional to the desired torque.

With this regulation, phase currents ia, ib, ic derived from the three-phase system of the PM machine are converted in a Park transformer 13 into Id_actual and Iq_actual currents of a rectangular coordinate system. Current Id_actual is the actual value for the direct-axis component of current of the machine. Current Iq_actual denotes the actual value for the quadrature-axis component of current of the machine.

Actual value Id_actual of the direct-axis current component is sent via a heterodyne element 12 to a direct-axis current component regulator 1, and actual value Iq_actual of the quadrature-axis current component is sent as the actual value to a quadrature-axis current component regulator 2. Heterodyne element 12 receives as another input signal a feedback signal which is obtained from output quantity uq' of a stationary decoupling network 5. In addition to achieving the decoupling which is important for the regulating effect, stationary decoupling network 5 also fulfills the function of achieving field weakening on direct-axis current component regulator 1 in the upper rotational speed range in conjunction with output limiters 3 and 4 and an anti-windup method. This field weakening of the PM synchronous machine at higher rotational speeds is necessary because otherwise the induced machine voltage would be greater than the maximum power converter output voltage. The latter is limited by the power supply voltage, i.e., the vehicle electrical system voltage. In this field weakening operation, the power converter is operated in an override state, so the power converter output voltage is no longer sinusoidal.

The setpoint input of direct-axis current component regulator 1 receives a setpoint signal generated by a direct-axis current component setpoint generator 9 and the setpoint input of quadrature-axis current component regulator 2 receives a setpoint signal generated by a quadrature-axis current component setpoint generator 14. Quadrature-axis current component setpoint generator 14 generates the quadrature-axis current component setpoint signal as a function of the output signal of a battery voltage sensor.

At the output of direct-axis current component regulator 1, a manipulated variable Id* for the direct-axis current component is made available, and at the output of the quadrature-axis current component regulator 2 a manipulated variable Iq* is made available for the quadrature-axis current component. These manipulated variables are sent to stationary decoupling network 5 which determines a direct-axis voltage component ud' and a quadrature-axis voltage component uq' for the regulating voltage of the PM synchronous machine using the manipulated variables mentioned above.

These regulated voltage components ud' and uq' which are regulated voltage components in the rectangular coordinate system, are sent via output limiters 3 or 4 to an inverse Park transformer 6, which has the function of converting regulated voltage components ud and uq which are limited in the rectangular coordinate system to regulated voltage components ua, ub and uc of the three-phase system. These are converted in a pulse inverter 7 into triggering pulses for PM synchronous machine 8.

Quadrature-axis voltage component uq' of the regulated voltage output at the output of stationary decoupling network 5 is sent to absolute value generator 10, which determines absolute value |uq'| of the quadrature-axis voltage component.

The output signal of absolute value generator 10 is used as the input signal for a threshold value switch 11. If absolute value |uq'| exceeds a predetermined threshold value, then the value 0 is output at the output of threshold value switch 11. If absolute value |uq'| falls below the predetermined threshold value, then the value 1 is output at the output of threshold value switch 11.

Exemplary embodiments of a decoupling network in which a stationary machine model is stored are discussed and described in German patent document no. 100 44 181.5 by the present applicant German patent document no. 100 23 908 discusses a method for determining the rotor position of an electric machine which may be, for example, a three-phase generator having a pulse-width-modulation inverter, with a rotor winding, a stator equipped with inductors and a voltage source situated between two phase terminals also being provided. In this method, using switching elements provides for branching into two phases in which the particular phase voltage characteristics are measured. Superimposing them permits an unambiguous determination of the rotor position. In the case of this method, the rotor positions for each voltage curve are stored in the form of tables.

In addition, the journal ETEP, Vol. 8, No. 3, May/June 1998, pp. 157-166 discusses a permanent-magnet synchronous machine having field-weakening operation in which there is a large ratio of maximum speed to basic speed. This is achieved by an additional negative D component of the stator current. As part of the regulation of an available synchronous machine, the rotor position is measured using the output signals of three Hall sensors, one Hall sensor being assigned to each phase U, V and W.

SUMMARY OF THE INVENTION

The exemplary embodiment and/or exemplary method of the present invention provides a sensor-reduced regulating system which does not require any current sensors or current measurement. Only the battery actual voltage and the rotor angle or angular position are measured, rotational speed information also being derived from the latter by differentiation of the position information over time.

In generator operation of the PM synchronous machine, there is no sacrifice of performance in comparison with conventional field-oriented regulating systems.

Since PM synchronous machines may be used as crankshaft starter generators and are used there in the sense of a high-current application, the elimination of the need for current sensors is of great advantage because the required current sensors in high-current applications are particularly complex.

DETAILED DESCRIPTION

Figure 1:
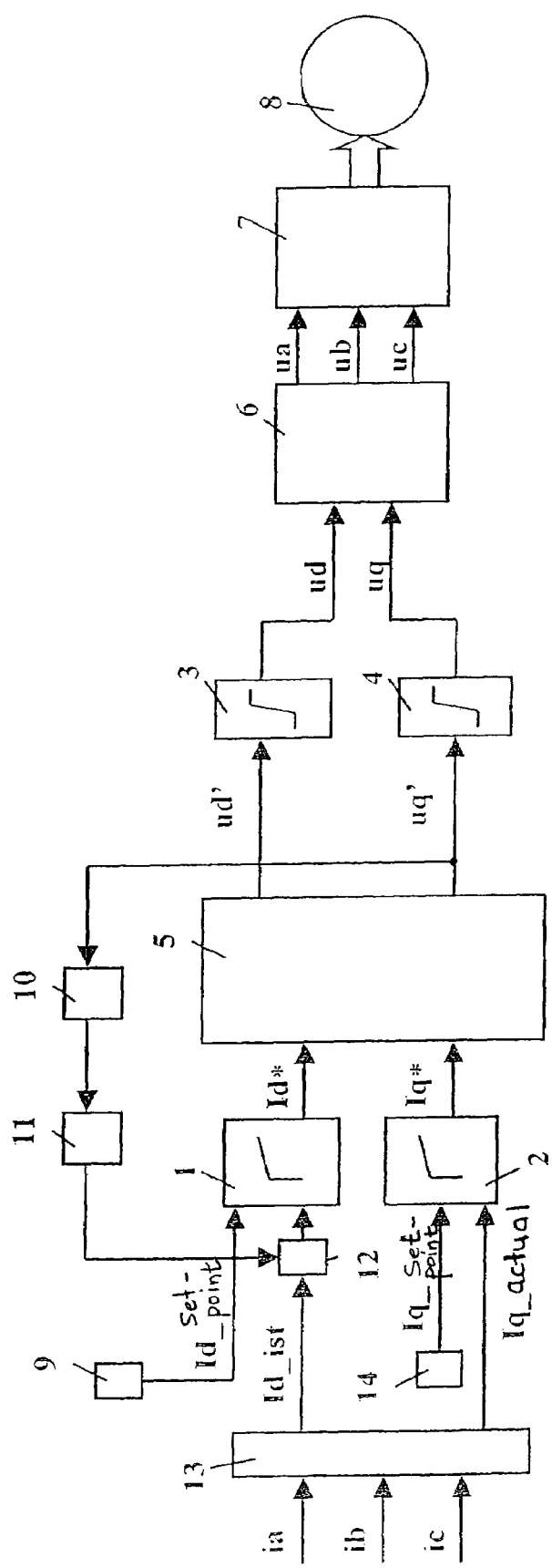
FIG. 1 shows a block diagram of a prior art field-oriented current regulation for a PM synchronous machine.
Figure 2:
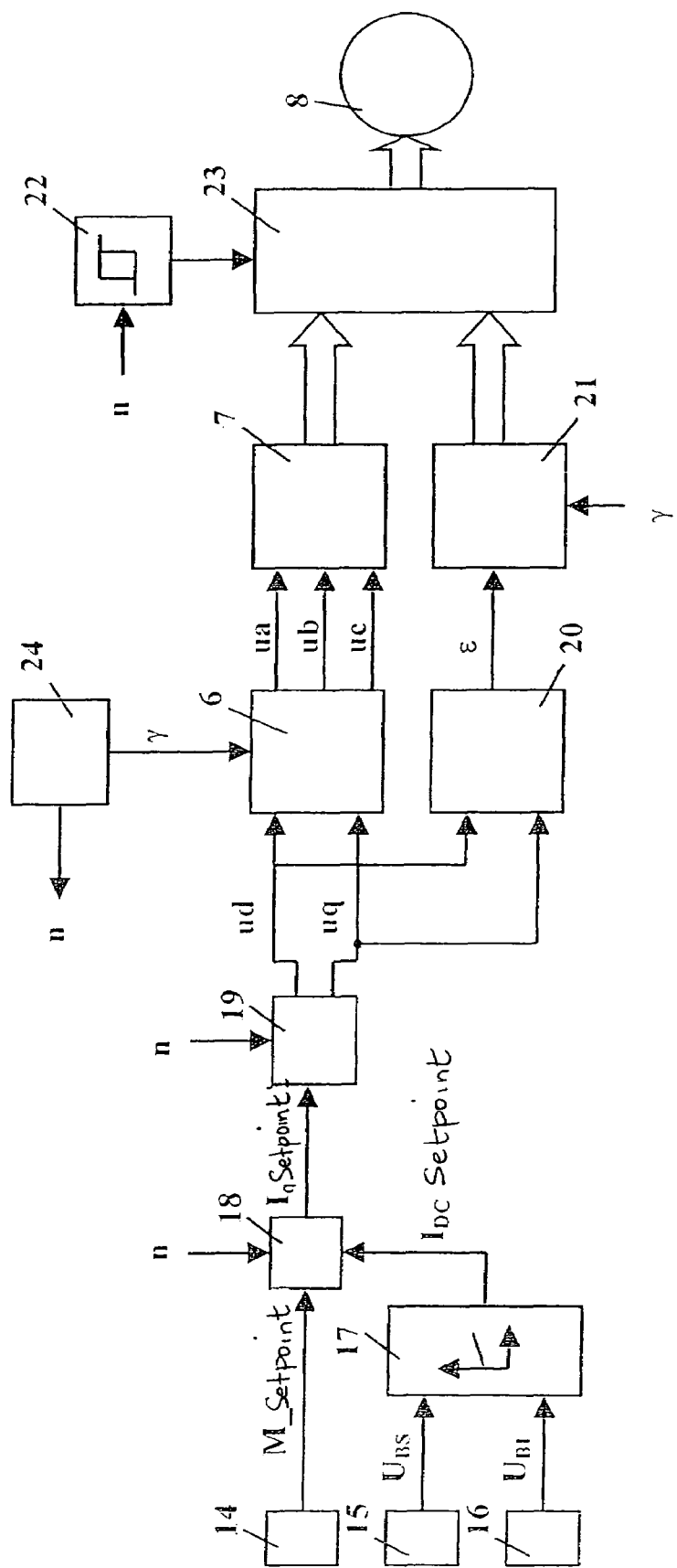
FIG. 2 shows a block diagram of an exemplary method of a field-oriented current regulation according to the present invention for a PM synchronous machine.

FIG. 2 shows a block diagram of an exemplary embodiment of a field-oriented current regulation according to the exemplary embodiment and/or exemplary method of the present invention for a PM synchronous machine 8. In this regulating method, it is not necessary to derive phase currents from the polyphase system of the PM machine and convert them into the actual value of the direct-axis current component and the actual value of the quadrature-axis current component of a rectangular coordinate system by using a Park transformer.

The device shown in FIG. 2 has a logic unit 18 which supplies a setpoint value Iq_setpoint for the quadrature-axis current component at its output. In addition, logic unit 18 has a plurality of inputs. A first input of logic unit 18 is connected to a higher-level control unit 14. A second input of logic unit 18 is connected to the output of a battery voltage regulator 17. The third input of logic unit 18 receives information regarding rotational speed n of the machine.

Battery voltage regulator 17 is connected at the input to a battery voltage setpoint generator 15 and a battery voltage sensor 16. Battery voltage setpoint generator 15, e.g., a higher-level energy management system supplies battery setpoint voltage $U_{BS}$ to battery voltage regulator 17. Battery voltage senor 16 is provided for measuring battery actual voltage $U_{BI}$. The battery actual voltage is picked up at an intermediate circuit capacitor (not shown), for example.

The starting procedure is as follows: a start command comes from higher-level control unit 14 and contains information regarding setpoint torque M_setpoint. In logic unit 18 quadrature-axis current component setpoint value Iq_setpoint is derived from this value. Quadrature-axis current component setpoint value Iq_setpoint is sent to stationary decoupling network 19 which contains a stationary machine model. In this decoupling network the quadrature-axis current component setpoint value is converted to a direct-axis voltage component ud and a quadrature-axis voltage component uq of the regulating voltage by including rotational speed n and the stored machine model. A stored table which takes into account machine parameters is used for this purpose. Depending on the accuracy of the machine model, more or less great sacrifices in performance occur with this conversion.

Beyond a predetermined rotational speed threshold value, e.g., 500 rpm, reversing logic 18 performs a reversing operation on the basis of which output signal $I_{DC\_}$ setpoint of battery voltage regulator 17 is now relayed as quadrature-axis current component setpoint value Iq_setpoint to decoupling network 19. In this network the quadrature-axis current component setpoint value is converted into a direct-axis voltage component ud and a quadrature-axis voltage component uq of the regulating voltage by including rotational speed n. This also makes use of the stored table in which machine parameters are taken into account. Inaccuracies in the machine model are compensated by the higher-level voltage regulation and do not result in any loss of efficiency in generator operation.

Voltage components ud and uq, which are determined via the stationary machine model and which are regulating voltage components in the rectangular coordinate system, are sent to an inverse Park transformer 6. This has the function of converting regulating voltage components ud and uq in the rectangular coordinate system into regulating voltage components ua, ub and uc of the three-phase system, taking into account rotor angle γ, which is determined by a position sensor 24. These voltage components are sent to a pulse-width-modulation inverter 7 which at its output provides triggering pulses for PM synchronous machine 8. The output of pulse-width-modulation inverter 7 is connected via a reversing unit 23 to PM machine 8 which is to be controlled.

Voltage components ud and uq are also sent to a computing unit 20 which determines from these voltage components setpoint angle ϵ between the rotor pole axis and the setpoint stator voltage vector. The following equation is used for this purpose:

$$\epsilon = \arctan \frac{ud}{uq}.$$

In the field-oriented regulation, zero-frequency quantities are regulated with a time constant that is the same over the entire regulating range, so computing unit 20 operates with the same clock frequency as the regulation.

The output signal of computing unit 20 is sent to a block switch mechanism 21 which is cycled directly by rotor angle γ. Information regarding the rotor angle is obtained via a position sensor 24, for example—as already explained above. Block switch mechanism 21, whose output signal is also sent to reversing logic 23, is used to select triggering pulses according to one of six possible switch states of the power converter.

Instead of a block switch mechanism, a software program which corresponds functionally to the block switch mechanism may also be used.

In reversing logic 23 there is a reversing operation in the sense that either the triggering pulses generated in pulse-width-modulation inverter 7 or those generated in block switch mechanism 21 are forwarded to PM machine 8. This reversing operation is performed as a function of rotational speed n taking into account an adjustable switching hysteresis implemented by hysteresis circuit 22. The hysteresis range is between 800 and 1000 rpm, for example.

Such triggering ensures a smooth transition from pulse-width-modulation inverter operation, in which the output signals of circuit block 7 are sent via reversing logic 23 to PM machine 8, to block operation, in which the output signals of block switch mechanism 21 are sent via reversing logic 23 to PM machine 8. This is attributed to the fact that the same regulator structure is used for the entire rotational speed range and at the reversing rpm the output signal of block switch mechanism 21 is equal to the output signal of pulse-width-modulation inverter 7, with the output signal of pulse-width-modulation inverter 7 being subject to a statistical angle inaccuracy, i.e., a jitter, which increases with an increase in rotational speed and results in unwanted fluctuations in power in the upper rotational speed range.

The transition from pulse-width-modulation inverter operation to block operation as described above is performed in order to avoid these unwanted power fluctuations in the upper rotational speed range.

These power fluctuations in the upper rotational speed range which occur in the related art are based on the fact that the switching frequency of the pulse-width-modulation inverter, i.e., the PWM inverter, must not be selected to be too great from the standpoint of the losses occurring. For the case of an application in a crankshaft starter generator, a PWM frequency of 8 kHz is therefore used, for example. The relationship between the rotational speed and the fundamental mode frequency of the current is therefore as follows:

$$f = \frac{n}{60} \cdot p.$$

Figure 3:
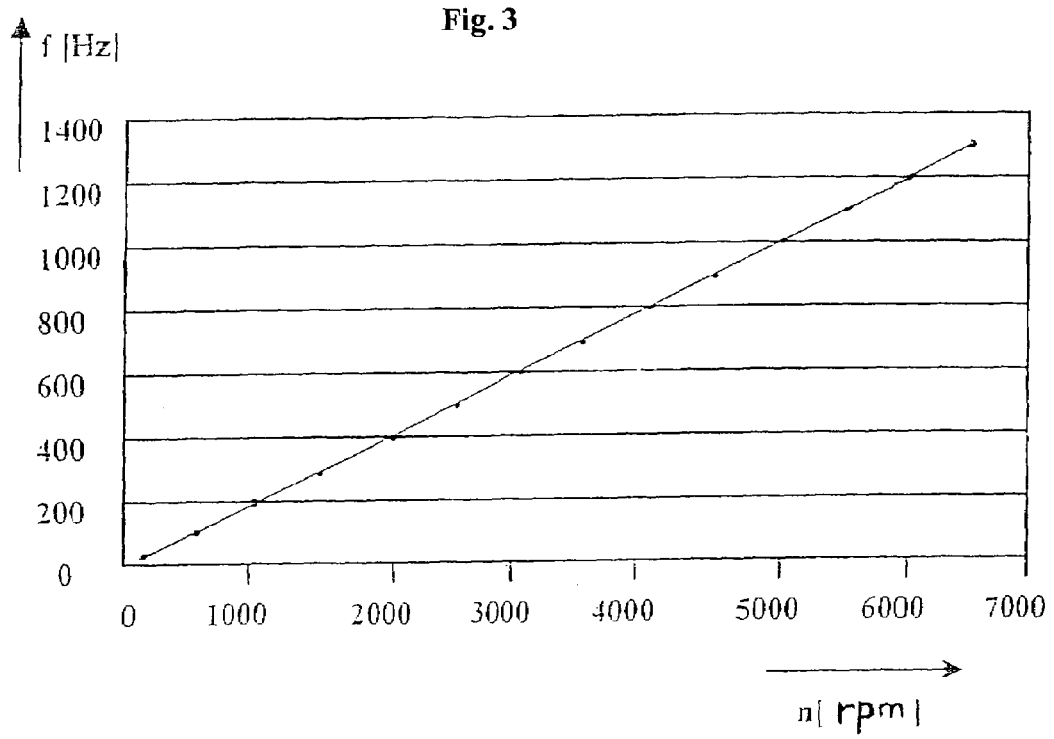
FIG. 3 shows a diagram illustrating the fundamental mode frequency of the current as a function of rotational speed.

For the rotational speed range of a $2 \cdot p = 24$-pole crankshaft starter generator whose rotational speed range is between 0 and 6500 rpm, a frequency range of 0 to 1300 Hertz is therefore necessary. This is shown in FIG. 3, which is a diagram illustrating the fundamental mode frequency of the current as a function of the rotational speed. This diagram shows rotational speed n in rpm on the abscissa and frequency f in Hertz on the ordinate.

Figure 4:
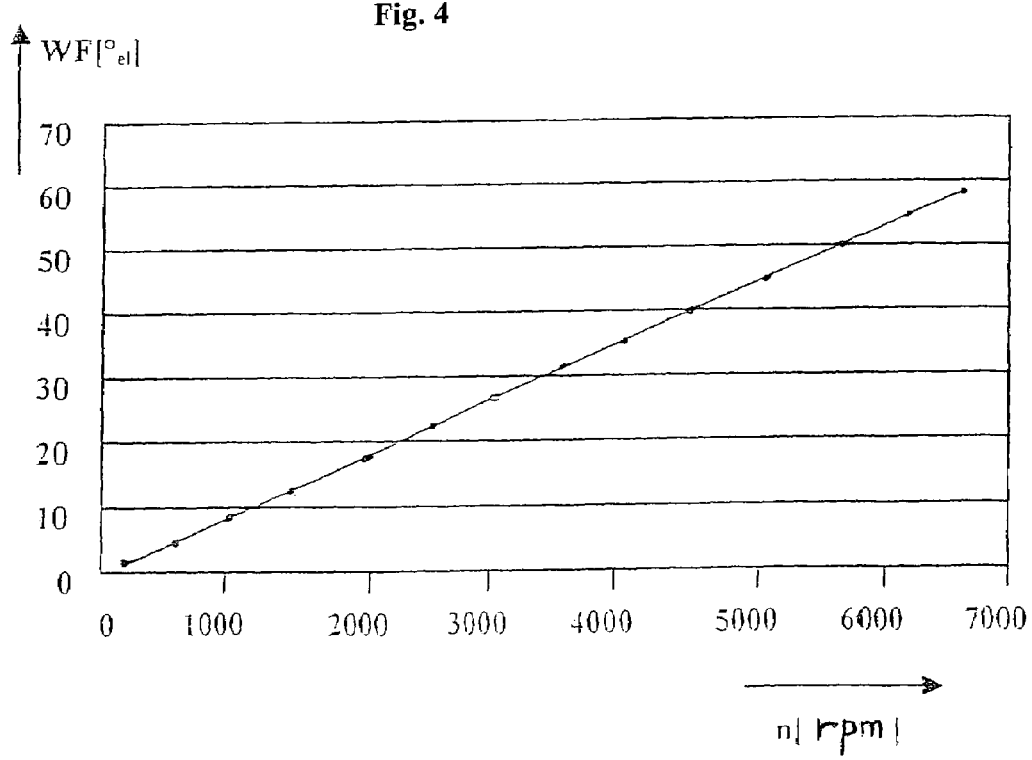
FIG. 4 shows a diagram illustrating the maximum phase-angle error as a function of rotational speed.

A PWM frequency of 8 kHz prevails over the entire operating range, so this yields an angle inaccuracy with respect to the setpoint voltage zero crossing and the voltage zero crossing actually switched due to the ratio of the fundamental mode of the current to the pulse frequency. This is depicted in FIG. 4 which shows a diagram illustrating the maximum phase-angle error based on the setpoint voltage zero crossing as a function of the rotational speed for a PWM frequency of 8 kHz. This diagram shows rotational speed n in rpm on the abscissa and phase-angle error WF in degrees on the ordinate.

The statistical inaccuracy, i.e., jitter, results in unwanted power fluctuations in the upper rotational speed range. To prevent this statistical inaccuracy, an rpm-dependent switching, i.e., an rpm-dependent transition from PWM operation to block operation occurs according to the exemplary embodiment above described on the basis of FIG. 2. As an alternative, the power fluctuations mentioned above may also be prevented by increasing the PWM frequencies, e.g., to switching frequencies up to 90 kHz. However, this is not advisable because of the high switching losses and high power converter complexity.

Other advantages of the exemplary embodiment depicted in FIG. 2 include the fact that there is only a slight additional processor load because computing unit 20 is able to operate at a constant regulating frequency independently of the rotational speed. In the case of PWM operation over the entire regulating range, the PWM frequency and thus the frequency for the inverse Park transformation would have to be increased with the rotational speed, which would have resulted in a great processor load.

In addition, the switching frequency of the power converter is low, which is associated with low switching losses of the power converter.

Furthermore, the angle inaccuracies attributable to PWM cycling are eliminated and thus the unwanted power fluctuations attributable to them are also eliminated. The angle inaccuracy depends only on the position sensor itself.

A list of the Reference Notations is as follows:

1 Direct-axis current component regulator
2 Quadrature-axis current component regulator
3 Limiter
4 Limiter
5 Decoupling network
6 Inverse Park transformer
7 Pulse-width-modulation inverter
8 PM synchronous machine
9 Direct-axis current component setpoint generator
10 Absolute value generator
11 Threshold value switch
12 Heterodyne element
13 Park transformer
14 Higher-level controller (engine control unit)
15 Battery voltage setpoint generator
16 Battery voltage sensor
17 Battery voltage regulator
18 Logic unit
19 Decoupling network with a stationary machine model
20 Computing unit
21 Block switch mechanism
22 Hysteresis circuit
23 Reversing logic
24 Position sensor for rotor angle
ia, ib, ic Phase currents from the three-phase system
Id_actual Actual value of direct-axis current component
Id_setpoint Setpoint value of direct-axis current component
Iq_actual Actual value of quadrature-axis current component
Iq_setpoint Setpoint value of quadrature-axis current component
Id* Manipulated variable for the direct-axis current component
$I_{DC}$_setpoint Quadrature-axis current component setpoint value of the battery voltage regulator
Iq* Manipulated variable for the quadrature-axis current component
M_setpoint Setpoint torque
n Rotational speed
ua, ub, uc Regulating voltages for the three-phase system
$U_{BS}$ Battery voltage setpoint value
$U_{BI}$ Battery voltage actual value
ud, ud' Direct-axis component of the regulated voltage
uq, uq' Quadrature-axis component of the regulated voltage
WF Phase-angle error
ε Setpoint angle
γ Rotor angle

What is claimed is:

1. A method for field-oriented regulating a synchronous machine excited by a permanent magnet, the method comprising:

determining a quadrature-axis current component setpoint value;

supplying the quadrature-axis current component setpoint value and rotational speed information to a decoupling network which contains a stationary machine model;

determining a direct-axis voltage component and a quadrature-axis voltage component in the decoupling network as a function of only the quadrature-axis current component setpoint value, the rotational speed information and the stationary machine model; and converting the direct-axis voltage component and the quadrature-axis voltage component into triggering pulses for the synchronous machine.

2. The method of claim 1, wherein the quadrature-axis current component setpoint value is determined in a logic unit.

3. The method of claim 2, wherein a reversing operation is performed in the logic unit as a function of a predetermined rotational speed threshold value.

4. The method of claim 3, wherein the quadrature-axis current component setpoint value is derived by a higher-level control unit at rotational speeds which are lower than the predetermined rotational speed threshold value.

5. The method of claim 4, wherein the quadrature-axis current component setpoint value is derived from a setpoint torque predetermined by the higher-level control unit.

6. The method of claim 5, wherein the setpoint torque is the starting torque.

7. The method of claim 3, wherein the quadrature-axis current component setpoint value is derived by a battery voltage regulator at rotational speeds which are greater than the predetermined rotational speed threshold value.

8. The method of claim 7, wherein the battery voltage regulator determines the quadrature-axis current component setpoint value as a function of a battery voltage setpoint value supplied by a higher-level energy management system and a battery voltage actual value supplied by a battery voltage sensor.

9. A device for field-oriented regulating a synchronous machine excited by a permanent magnet, comprising:

a decoupling network which includes a stationary machine model having an input for a quadrature-axis current component setpoint value and an input for rotational speed information, and which is provided for determining a direct-axis voltage component and a quadrature-axis voltage component as a function of only the quadrature-axis current component setpoint value, the rotational speed information and the stationary machine model, and a conversion unit which is connected to the decoupling network for converting the direct-axis voltage component and the quadrature-axis voltage component into triggering pulses for the synchronous machine.

10. The device of claim 9, wherein it includes a logic unit having an output for the quadrature-axis current component setpoint value.

11. The device of claim 10, wherein the logic unit has an input for rotational speed information and for performing a reversing operation as a function of a predetermined rotational speed threshold value.

12. The device of claim 11, wherein the logic unit outputs at its output a quadrature-axis current component setpoint value which is derived by a higher-level control unit at rotational speeds which are lower than the predetermined rotational speed threshold value.

13. The device of claim 12, wherein the logic unit derives the quadrature-axis current component setpoint value from a setpoint torque which is derived by the higher-level control unit.

14. The device of claim 13, wherein the setpoint torque is a starting torque.

15. The device of claim 11, wherein the logic unit outputs at its output a quadrature-axis current component setpoint value which is supplied by a battery voltage regulator at rotational speeds which are greater than the predetermined rotational speed threshold value.

16. The device of claim 15, wherein the battery voltage regulator has a battery voltage setpoint value input which is connected to a higher-level energy management system and has a battery voltage actual value input which is connected to a battery voltage sensor.

* * * * *